United States Patent
Wang et al.

(10) Patent No.: US 8,711,725 B2
(45) Date of Patent: Apr. 29, 2014

(54) METHOD AND SYSTEM FOR ACQUIRING SUPPORT CAPABILITY OF MOBILE TERMINAL BY BASE STATION SIDE SYSTEM

(75) Inventors: Xinhui Wang, Shenzhen (CN); Zhendong Kuang, Shenzhen (CN); Shen Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 195 days.

(21) Appl. No.: 13/516,086

(22) PCT Filed: Dec. 16, 2009

(86) PCT No.: PCT/CN2009/075649
§ 371 (c)(1),
(2), (4) Date: Jun. 14, 2012

(87) PCT Pub. No.: WO2011/072444
PCT Pub. Date: Jun. 23, 2011

(65) Prior Publication Data
US 2012/0250566 A1      Oct. 4, 2012

(51) Int. Cl.
*H04W 24/10* (2009.01)
(52) U.S. Cl.
USPC .......... 370/252; 370/335; 370/332; 370/329; 455/450; 455/452.2; 455/442
(58) Field of Classification Search
USPC .......... 370/252, 331, 335, 332, 329; 455/450, 455/452.2, 442
See application file for complete search history.

(56) References Cited

U.S. PATENT DOCUMENTS

| | | | |
|---|---|---|---|
| 6,442,143 B1 * | 8/2002 | Corry | 370/252 |
| 7,944,906 B2 * | 5/2011 | Xu et al. | 370/349 |
| 8,204,442 B2 * | 6/2012 | Sankar et al. | 455/63.1 |

(Continued)

FOREIGN PATENT DOCUMENTS

| | | |
|---|---|---|
| CN | 1741553 A | 3/2006 |
| CN | 1917706 A | 2/2007 |
| CN | 101437241 A | 5/2009 |

OTHER PUBLICATIONS

International Search Report in international application No. PCT/CN2009/075649, mailed on Sep. 23, 2010.

(Continued)

*Primary Examiner* — Rasheed Gidado
(74) *Attorney, Agent, or Firm* — Oppedahl Patent Law Firm LLC (57) ABSTRACT

A method for acquiring support capability of a mobile terminal by a base station side system is disclosed in the present disclosure, and the method includes: the base station side system applies a co-frequency interference to the mobile terminal, and detects a measurement report which is fed back by the mobile terminal after the co-frequency interference is applied, and determines and acquires the support capability of the mobile terminal for voice services over adaptive multi-user channels on one slot according to associated parameters in the detected measurement report in combination with associated threshold values. A system for acquiring support capability of the mobile terminal by the base station side system is also disclosed in the present disclosure. In the system, a base station side determining unit is configured to determine and acquire the support capability of the mobile terminal for voice services over adaptive multi-user channels on one slot according to associated parameters in detected measurement report in combination with associated threshold values. With the method and system in the present disclosure, the base station side system can adaptively and accurately acquire the support capability of the mobile terminal for Voice services over adaptive multi-user channels on one slot.

16 Claims, 6 Drawing Sheets (56) References Cited

U.S. PATENT DOCUMENTS

| | | | |
|---|---|---|---|
| 8,233,427 B2 * | 7/2012 | Reial et al. | 370/318 |
| 8,275,406 B2 * | 9/2012 | Chen | 455/522 |
| 2011/0255641 A1 * | 10/2011 | Lopez | 375/343 |

OTHER PUBLICATIONS

English Translation of the Written Opinion of the International Search Authority in international application No. PCT/CN2009/075649, mailed on Sep. 23, 2010.

* cited by examiner

METHOD AND SYSTEM FOR ACQUIRING SUPPORT CAPABILITY OF MOBILE TERMINAL BY BASE STATION SIDE SYSTEM

TECHNICAL FIELD

The present disclosure relates to the field of mobile communications, and in particular to a method and system for acquiring support capability of a mobile terminal by an adaptive base station subsystem in a Global System for Mobile Communications (GSM) system.

BACKGROUND

Figure 1:
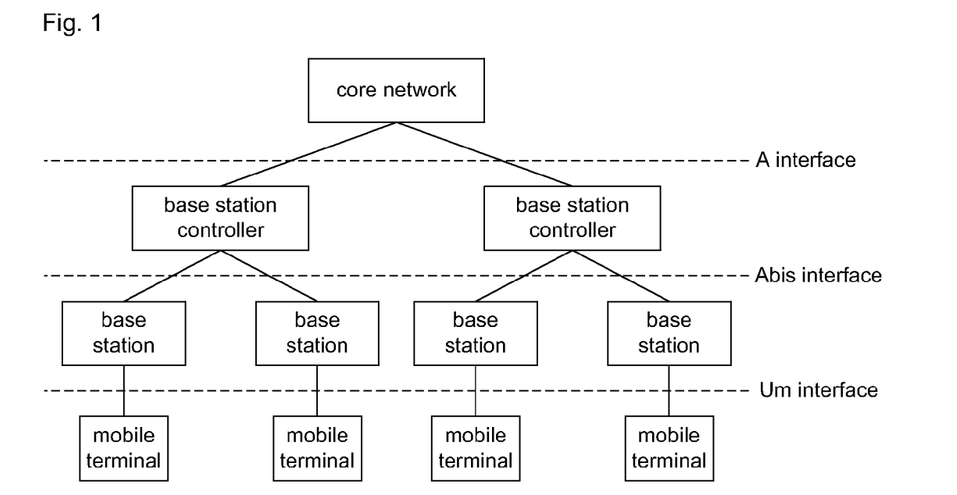
FIG. 1 is a diagram of network architecture of a traditional GSM network.

The network architecture of traditional GSM system is as shown in FIG. 1, and includes three layers, i.e., a core network, a base station controller and a base station. The base station controller and the base station can be collectively known as a base station subsystem. An interface between the core network and the base station controller is known as an A interface; an interface between the base station controller and the base station is known as an Abis interface; and an interface between the base station and the mobile terminal is known as an Um interface. The core network, the base station controller and the base station cooperate to provide a complete mobile voice service function to the mobile terminal.

Figure 2:
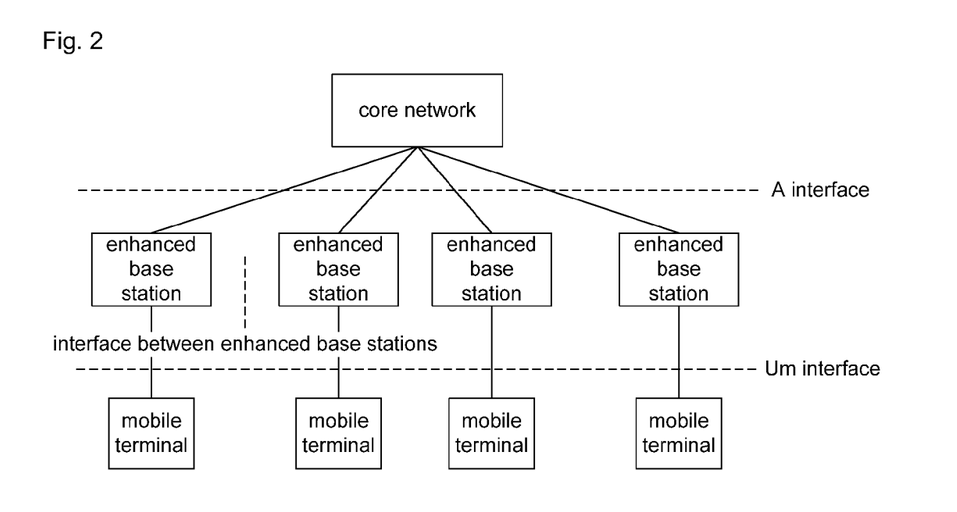
FIG. 2 is a diagram of network architecture of a flat GSM network.

As technologies evolve, there has been a flat GSM network architecture, and the interface thereof is as shown in FIG. 2. The flat GSM network mainly includes two layers, i.e., a core network and an enhanced base station. An interface between the core network and the enhanced base station is an A interface; an interface between the enhanced base station and the mobile terminal is an Um interface; and a new interface is defined between the enhanced base stations, which is known as an interface between enhanced base stations, and can be used for the interaction between the enhanced base stations. Although the behaviors in the air interface of the network architecture of the traditional GSM system and that of the flat GSM network architecture are the same, one of the advantages of the flat GSM network architecture is that: GSM can use the same architecture as the downward evolution version of High-Speed Packet Access (HSPA) which is also flat, i.e., HSPA+, or a Long Term Evolution (LTE) network to operate on a same spectrum, which will make providers to dynamically share the limited spectrum resources in different wireless technologies, such as GSM, HSPA+ or LTE etc. Thus, a scenario may show that HSPA+ or LTE occupies most of the spectrum resources, while GSM occupies fewer spectrum resources; however, the number of GSM users is not drastically reduced. This requires the GSM network to provide voice services for these users with relatively fewer spectrum resources, thus resulting in a great challenge to the traditional GSM technology.

Since the traditional GSM is a Time Division Multi Access (TDMA) system, the system capacity is limited by Time Slot (TS) resources, and one TS can only carry one Full Rate (FR) voice user or two Half Rate (HR) voice users simultaneously. As technologies evolve, there have been many techniques to improve spectrum utilization efficiency; and Voice services over Adaptive Multi-user channels on One Slot is an example. Voice services over Adaptive Multi-user channels on One Slot allows carrying two FR voice users or four HR voice users on one slot simultaneously, so as to enhance support capacity for voice users without increasing spectrum resources of the whole GSM network.

Using Voice services over Adaptive Multi-user channels on One Slot, the mobile terminal can report support capability for Voice services over Adaptive Multi-user channels on One Slot thereof via the interface between the mobile terminal and the base station subsystem. However, if the mobile terminal does not report support capability thereof due to some reasons such as defects on software design, or although the mobile terminal reports the capability, the base station subsystem desires to know more precise, or more detailed capability for Voice services over Adaptive Multi-user channels on One Slot supported by the mobile terminal, a solution is needed. On one hand, the solution enables the network to automatically detect the support capability for Voice services over Adaptive Multi-user channels on One Slot in the condition that the mobile terminal does not report the support capability for Voice services over Adaptive Multi-user channels on One Slot; on the other hand, the solution enables the base station side system such as the base station subsystem in the traditional GSM network to know more precise, or more detailed capability for Voice services over Adaptive Multi-user channels on One Slot supported by the mobile terminal after the mobile terminal reports it has the capability. However, such solution does not exist in the prior art. Therefore, when this new technology of Voice services over Adaptive Multi-user channels on One Slot is introduced, the base station subsystem cannot acquire the capability of those mobile terminals which do not report the support capability for Voice services over Adaptive Multi-user channels on One Slot, and thus cannot use the technology of Voice services over Adaptive Multi-user channels on One Slot more effectively.

SUMMARY

In view of this, the main purpose of the present disclosure is to provide a method and system for acquiring support capability of a mobile terminal by a base station side system, so as to solve the problems of the above two aspects in the prior art, thereby enabling the base station side system to acquire adaptively and accurately the support capability of the mobile terminal for Voice services over Adaptive Multi-user channels on One Slot.

To achieve the above purpose, the technical solution of the present disclosure is implemented as follows:

A method for acquiring support capability of a mobile terminal by a base station side system, including:

the base station side system applies a co-frequency interference to the mobile terminal;

the base station side system detects a measurement report which is fed back by the mobile terminal after the co-frequency interference is applied, and determines and acquires the support capability of the mobile terminal for Voice services over Adaptive Multi-user channels on One Slot according to associated parameters in the detected measurement report in combination with associated threshold values.

Here, before the co-frequency interference is applied, the method may further include: the base station side system predetermines the support capability of the mobile terminal for Voice services over Adaptive Multi-user channels on One Slot according to the associated threshold values in combination with associated parameters in a downlink measurement report which is fed back by the mobile terminal before the co-frequency interference is applied.

Here, applying co-frequency interference may further include: one round of co-frequency interference is applied, or multiple rounds of co-frequency interference are applied, wherein when multiple rounds of co-frequency interference are applied, a number of rounds of co-frequency interference to be applied needs to be set; the number of rounds is set according to a specific application environment and an implementation feature of the base station side system;

Here, the associated parameters are parameters for characterizing interference processing capability of the mobile terminal;

Here, when multiple rounds of co-frequency interference are applied, the method may further include: when one of determination results obtained after respective rounds of co-frequency interference are applied can determine the mobile terminal has the capability, it is determined that the mobile terminal is a mobile terminal with the capability; or when each determination result obtained after respective rounds of co-frequency interference are applied can determine the mobile terminal has the capability, it is determined that the mobile terminal is a mobile terminal with the capability.

Here, the predetermining may particularly include at least one of the following:

a mean of parameter values of received signal qualities in N latest continuous or discrete downlink measurement reports is calculated, and it is predetermined that the mobile terminal is a mobile terminal with the capability when the calculated mean is smaller than a threshold value T0;

a standard deviation of parameter values of received signal qualities in N latest continuous or discrete downlink measurement reports is calculated, and it is predetermined that the mobile terminal is a mobile terminal with the capability when the calculated standard deviation is smaller than a threshold value T1, wherein the received signal qualities are received signal qualities in the downlink measurement reports with the mean of the received signal qualities being smaller than a threshold value T0;

a mean of parameter values of received signal intensities in N latest continuous or discrete downlink measurement reports is calculated, and a mean and a standard deviation of parameter values of the received signal qualities in the measurement reports with the mean of received signal intensities being smaller than a threshold value T2 are calculated, and it is predetermined that the mobile terminal is a mobile terminal with the capability when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

Here, the determining may particularly include at least one of the following:

a mean of parameter values of received signal qualities in N latest continuous or discrete measurement reports is calculated, and it is determined that the mobile terminal is a mobile terminal with the capability when the calculated mean is smaller than a threshold value T3;

a standard deviation of parameter values of the received signal qualities in N latest continuous or discrete measurement reports is calculated, and it is determined that the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

a mean of parameter values of the received signal intensities in N latest continuous or discrete measurement reports is calculated, and a mean and a standard deviation of parameter values of the signal qualities in the measurement reports with the mean of received signal intensities being smaller than a threshold value T5 are calculated, and it is determined that the mobile terminal is a mobile terminal with the capability when the calculated standard deviation is smaller than the threshold value T4, wherein the received signal qualities utilized when calculating the standard deviation of the received signal quality are received signal qualities in the measurement reports with the mean of the received signal qualities being smaller than the threshold value T3.

A system for acquiring support capability of a mobile terminal by a base station side system includes: a base station side interference applied unit, a base station side detecting unit and a base station side determining unit; wherein the base station side interference applied unit is configured to apply a co-frequency interference to the mobile terminal;

the base station side detecting unit is configured to detect a measurement report which is fed back by the mobile terminal after the co-frequency interference is applied; and the base station side determining unit is configured to determine and acquire the support capability of the mobile terminal for Voice services over Adaptive Multi-user channels on One Slot according to associated parameters in the detected measurement report in combination with associated threshold values.

Here, before the co-frequency interference is applied, the base station side determining unit may further be configured to predetermine the support capability of the mobile terminal for Voice services over Adaptive Multi-user channels on One Slot according to associated parameters in a downlink measurement report which is fed back by the mobile terminal in combination with the associated threshold values.

Here, the base station side determining unit may further be configured implement at least one of the following predetermining implementations, wherein the predetermining implementations may particularly include:

a mean of parameter values of received signal qualities in N latest continuous or discrete downlink measurement reports is calculated, and it is determined that the mobile terminal is a mobile terminal with the capability when the calculated mean is smaller than a threshold value T0;

a standard deviation of parameter values of received signal qualities in N latest continuous or discrete downlink measurement reports is calculated, and it is predetermined that the mobile terminal is a mobile terminal with the capability when the calculated standard deviation is smaller than a threshold value T1, wherein the received signal qualities are received signal qualities in the downlink measurement reports with the mean of the received signal qualities being smaller than the threshold value T0;

a mean of parameter values of received signal intensities in N latest continuous or discrete downlink measurement reports is calculated, and a mean and a standard deviation of parameter values of the received signal qualities in the measurement reports with the mean of received signal intensities being smaller than the threshold value T2 are calculated, and it is predetermined that the mobile terminal is a mobile terminal with the capability when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

Here, the base station side determining unit may further be configured to implement at least one of the following determining implementations, wherein the determining implementations may particularly include:

a mean of parameter values of received signal qualities in N latest continuous or discrete measurement reports is calculated, and it is determined that the mobile terminal is a mobile terminal with the capability when the calculated mean is smaller than a threshold value T3;

a standard deviation of parameter values of the received signal qualities in N latest continuous or discrete measurement reports is calculated, and it is determined that the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

a mean of parameter values of received signal intensities in N latest continuous or discrete measurement reports is calculated, and a mean and a standard deviation of parameter values of the received signal qualities in the measurement reports with the mean of received signal intensities being smaller than a threshold value T5 are calculated, and it is determined that the mobile terminal is a mobile terminal with the capability when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

The base station side system of the present disclosure applies a co-frequency interference to the mobile terminal and detects a measurement report which is fed back by the mobile terminal after the co-frequency interference is applied, and determines and acquires the support capability of the mobile terminal for Voice services over Adaptive Multi-user channels on One Slot according to associated parameters in the detected measurement report in combination with associated threshold values.

With the present disclosure, the base station side system can determine whether the mobile terminal has the support capability for Voice services over Adaptive Multi-user channels on One Slot, in the condition that the mobile terminal does not report the support capability for Voice services over Adaptive Multi-user channels on One Slot. Alternatively, although the mobile terminal reports whether it has the support capability for Voice services over Adaptive Multi-user channels on One Slot, in the condition of desiring to know more precise, or more detailed capability supported by the mobile terminal for Voice services over Adaptive Multi-user channels on One Slot, the base station subsystem can automatically detect and determine the support capability for Voice services over Adaptive Multi-user channels on One Slot.

DETAILED DESCRIPTION

The basic principle of the present disclosure is to accurately determine the support capability of a mobile terminal for Voice services over Adaptive Multi-user channels on One Slot through feedbacking measurement report after applying interference to the mobile terminal and making determination thereafter.

Hereinafter, the implementation of the technical solution will be described further in detail in combination with the accompany drawings.

A method for acquiring support capability of a mobile terminal by a base station side system includes the following steps:

Step 101: the base station side system applies a co-frequency interference to the mobile terminal.

Step 102: the base station side system detects a measurement report which is fed back by the mobile terminal after the co-frequency interference is applied, and determines and acquires the support capability of the mobile terminal for Voice services over Adaptive Multi-user channels on One Slot according to associated parameters in the detected measurement report in combination with associated threshold values.

Here, the associated threshold values are pre-set by the base station side system, and the presetting is omitted here.

Here, different from using the process of determination directly in the above Step 102, in order to rapidly acquire the support capability of the mobile terminal for Voice services over Adaptive Multi-user channels on One Slot, the present disclosure can further perform predetermination before the interference is applied. Specifically, before the co-frequency interference is applied, the method may further include: the base station side system predetermines the support capability of the mobile terminal for Voice services over Adaptive Multi-user channels on One Slot according to associated parameters in a downlink measurement report, which is fed back by the mobile terminal before the co-frequency interference is applied, in combination with associated threshold values.

Here, the applying co-frequency interference in Step 101 may further comprise: applying one round of co-frequency interference or applying multiple rounds of co-frequency interference, wherein when multiple rounds of co-frequency interference are applied, a number of rounds of co-frequency interference to be applied needs to be set; the number of rounds is set according to a specific application environment and implementation features of the base station side system.

Here, the associated parameters are parameters for characterizing interference processing capability of the mobile terminal.

It should be noted that for the mobile terminal side, both the downlink measurement report involved in the predetermination and the measurement report involved in the determination process are the measurement report, and the only difference therebetween is whether it is a measurement report fed back before applying interference or it is a measurement report fed back after applying interference. Similarly, for the base station side, both of them are measurement reports, and the only difference therebetween is whether it is a measurement report detected before applying interference or it is a measurement report detected after applying interference.

Here, when multiple rounds of co-frequency interference are applied, the method may further comprise: it is determined that the mobile terminal is a mobile terminal with support capability for Voice services over Adaptive Multi-user channels on One Slot, as long as one of predetermination/determination results can determine the mobile terminal has the support capability, no matter whether it is for the predetermination or the determination process;

Here, when multiple rounds of co-frequency interference are applied, the method may further comprise another implementation with the strongest limitation principle, i.e., it is determined that the mobile terminal is a mobile terminal with support capability for Voice services over Adaptive Multi-user channels on One Slot, only if each determination result determines that the mobile terminal has the support capability, no matter whether it is for the predetermination or the determination process.

The predetermination process and determination process will be described respectively as follows.

The first stage: predetermination process.

The predetermination process may particularly include at least one of the following:

First: a mean of parameter values of received signal qualities in N latest continuous or discrete downlink measurement reports is determined, and it is predetermined that the mobile terminal is a mobile terminal with the support capability for Voice services over Adaptive Multi-user channels on One Slot when the calculated mean is smaller than a threshold value T0.

It should be pointed out that no matter it is for the predetermination or the determination, actually, both are for determining a possibility that the mobile terminal has the support capability for Voice services over Adaptive Multi-user channels on One Slot, i.e., it is predetermined that the mobile terminal may be a mobile terminal with the support capability for Voice services over Adaptive Multi-user channels on One Slot, which will be omitted here.

Second: a standard deviation of parameter values of received signal qualities in N latest continuous or discrete downlink measurement reports is calculated, and it is predetermined that the mobile terminal is a mobile terminal with the support capability for Voice services over Adaptive Multi-user channels on One Slot when the calculated standard deviation is smaller than threshold value T1, wherein the received signal qualities are received signal qualities in the downlink measurement reports with the mean thereof being smaller than the threshold value T0.

Third: a mean of parameter values of received signal intensities in N latest continuous or discrete downlink measurement reports is calculated, and a mean and a standard deviation of parameter values of the received signal qualities in the measurement reports with the mean of the received signal intensities being smaller than a threshold value T2 are calculated, and it is predetermined that the mobile terminal is a mobile terminal with the support capability for Voice services over Adaptive Multi-user channels on One Slot when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

The second stage: determination process.

The determination process may particularly include at least one of the following:

First: a mean of parameter values of received signal qualities in N latest continuous or discrete measurement reports is calculated, and it is determined that the mobile terminal is a mobile terminal with the support capability for Voice services over Adaptive Multi-user channels on One Slot when the calculated mean is smaller than a threshold value T3.

Second: a standard deviation of parameter values of the received signal qualities in N latest continuous or discrete measurement reports is calculated, and it is predetermined that the mobile terminal is a mobile terminal with the support capability for Voice services over Adaptive Multi-user channels on One Slot when the calculated standard deviation is smaller than a threshold value T4, wherein the received signal qualities are received signal qualities in the measurement reports with the mean thereof being smaller than the threshold value T3.

Third: a mean of parameter values of received signal intensities in N latest continuous or discrete measurement reports is calculated, and a mean and a standard deviation of parameter values of the received signal qualities in the measurement reports with the mean of the received signal intensities being smaller than a threshold value T5 are calculated, and it is determined that the mobile terminal is a mobile terminal with the support capability for Voice services over Adaptive Multi-user channels on One Slot when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

In conclusion, the solution of the present disclosure is an implementation for the base station side system to adaptively and accurately acquire the interference suppression capability of the mobile terminal in the mode for Voice services over Adaptive Multi-user channels on One Slot in a GSM system. The GSM system herein includes a traditional GSM system, and also includes a flat GSM system. With the present disclosure, in the GSM network, the network can automatically detect and determine a mobile terminal supporting the capability for Voice services over Adaptive Multi-user channels on One Slot in the condition that the mobile terminal does not report the support capability for Voice services over Adaptive Multi-user channels on One Slot, or although the mobile terminal reports whether it has this capability, the base station side system desires to know more precise, or more detailed capability for Voice services over Adaptive Multi-user channels on One Slot supported by the mobile terminal. Thus, after the GSM network uses the technology of Voice services over Adaptive Multi-user channels on One Slot, the support capacity for voice users by the whole GSM network can be enhanced without increasing spectrum resources. In the prior art, as the base station side system cannot acquire this capability supported by the mobile terminal, during using Voice services over Adaptive Multi-user channels on One Slot, the base station side system cannot assign suitable channels to users, thus resulting in low channel utilization; however, with the present disclosure, as the base station side system can acquire this capability supported by the mobile terminal, the base station side system can accurately assign suitable channels to users, i.e., distributing a channel for the users with the most suitable match, thus greatly enhancing the channel utilization.

Taking the traditional GSM system as an example, the base station side system now is a base station subsystem. The present disclosure mainly includes the following content:

The base station subsystem achieves the automatic detecting function of the support capability for Voice services over Adaptive Multi-user channels on One Slot through the following two stages, i.e., first stage and second stage. The first stage is relative to the second stage after applying interference. The first stage is a predetermining stage, and the second stage after applying interference is an accurate determining stage, and both of them will be set forth respectively as follows.

The first stage: the base station subsystem can determine the support capability of the mobile terminal for Voice services over Adaptive Multi-user channels on One Slot by analyzing associated parameters for characterizing interference processing capability of the mobile terminal in the downlink measurement reports, wherein the associated parameters for characterizing interference processing capability of the mobile terminal include received signal qualities, or received signal intensities and the like.

Here, the first stage is to firstly predetermine which mobile terminals have stronger interference suppression capability. The mobile terminals with stronger interference suppression capability may be mobile terminals capable of supporting Voice services over Adaptive Multi-user channels on One Slot.

Whether the first stage is necessary can be decided according to different strategies. For example, in some conditions where it is necessary, if the mobile terminal does not report, or only reports few measurement reports while the base station subsystem intends to immediately acquire whether the mobile terminal has the support capability for Voice services over Adaptive Multi-user channels on One Slot, the first stage (predetermining stage) can be skipped and the second stage is performed directly for determining on the mobile terminal; or predetermination can be performed according to the few number of measurement reports.

The second stage: the base station subsystem applies x rounds of co-frequency interference to these mobile terminals which are predetermined to have stronger interference suppression capability. The means of applying is: to firstly apply one round of co-frequency interference, with power intensity and duration of this round of co-frequency interference being set according to strategies of the base station subsystem, and then to analyze associated parameters (for example, received signal qualities, received signal intensities) in one or more downlink measurement reports when the co-frequency interference is applied, and if these parameters are better than a threshold value, a next round of co-frequency interference will be applied. Similarly, the power intensity and duration of the next round of co-frequency interference can be set according to the strategies of the base station subsystem, and the associated parameters (for example, received signal qualities, received signal intensities) in one or more downlink measurement reports obtained when the co-frequency interference is applied are then analyzed, and if these parameters are better than a threshold value, another round of co-frequency interference will be applied. Multiple rounds of co-frequency interference are applied until the number of rounds is equal to pre-set x, wherein the value of x can be equal to 1 or 2, or can be defined according to specific application environment and implementation features of the base station subsystem.

For example, the strategies of the above "being set according to strategies of the base station subsystem" are as follows:

First, for the strategies of the power: when the first round of the co-frequency interference is applied, the power intensity of the applied co-frequency interference and signal power can be the same; when the second round of the co-frequency interference is applied, the power intensity of the applied co-frequency interference can be twice as that of the signal power; and when the third round of the co-frequency interference is applied, the power intensity of the applied co-frequency interference can be three times as that of the signal power, and so on. In addition, when the first round of the co-frequency interference is applied, the power intensity of the applied co-frequency interference and signal power can be the same; when the second round of the co-frequency interference is applied, the power intensity of the applied co-frequency interference and signal power can also be the same; and when the third round of the co-frequency interference is applied, the power intensity of the applied co-frequency interference and signal power can also be the same, and so on.

Second, for the strategies of the duration: the duration may be 104 TDMA frames, or can also be 10 TDMA frames. In addition, the duration may be 8 bursts or 32 bursts and so on. The strategies of the duration can further include continuous or discontinuous applying of co-frequency interference.

The base station subsystem adaptively determines the capability of the mobile terminal for Voice services over Adaptive Multi-user channels on One Slot by analyzing associated parameters such as received signal qualities and received signal intensities in the downlink measurement reports, which are applied with the co-frequency interference, in combination with associated threshold values pre-set by the base station subsystem. Specifically, the determination for the capability of the mobile terminal for Voice services over Adaptive Multi-user channels on One Slot is implemented according to the strategies of the base station subsystem.

The ways of applying co-frequency interference applied by the base station subsystem may be various, for example, one way may be applying the co-frequency interference by several consecutive burst pulses, another way may be applying the co-frequency interference by several discrete (inconsecutive) burst pulses.

The modulation ways of the co-frequency interference applied by the base station subsystem can also be various, for example, the co-frequency interference is an interference signal modulated by Gaussian filtered Minimum Shift Keying (GMSK) and having the same phase as the measured signal, or a GMSK modulated signal having a phase difference $\pi/2$ with respect to the measured signal, or a modulation signal modulated by Voice services over Adaptive Multi-user channels on One Slot in combination with the measured signal; in sum, the base station subsystem can use different ways according to the strategies.

The present disclosure will be set forth by way of example hereinafter.

Method example: The case is that the base station side system is a base station subsystem while the mobile terminal is in a dedicated mode. It should be illustrated that the terminal typically has two modes; one is idle mode and the other is dedicated mode. The idle mode represents the mobile terminal is in an idle state, and the dedicated mode represents the mobile terminal is in a non-idle state.

Figure 3:
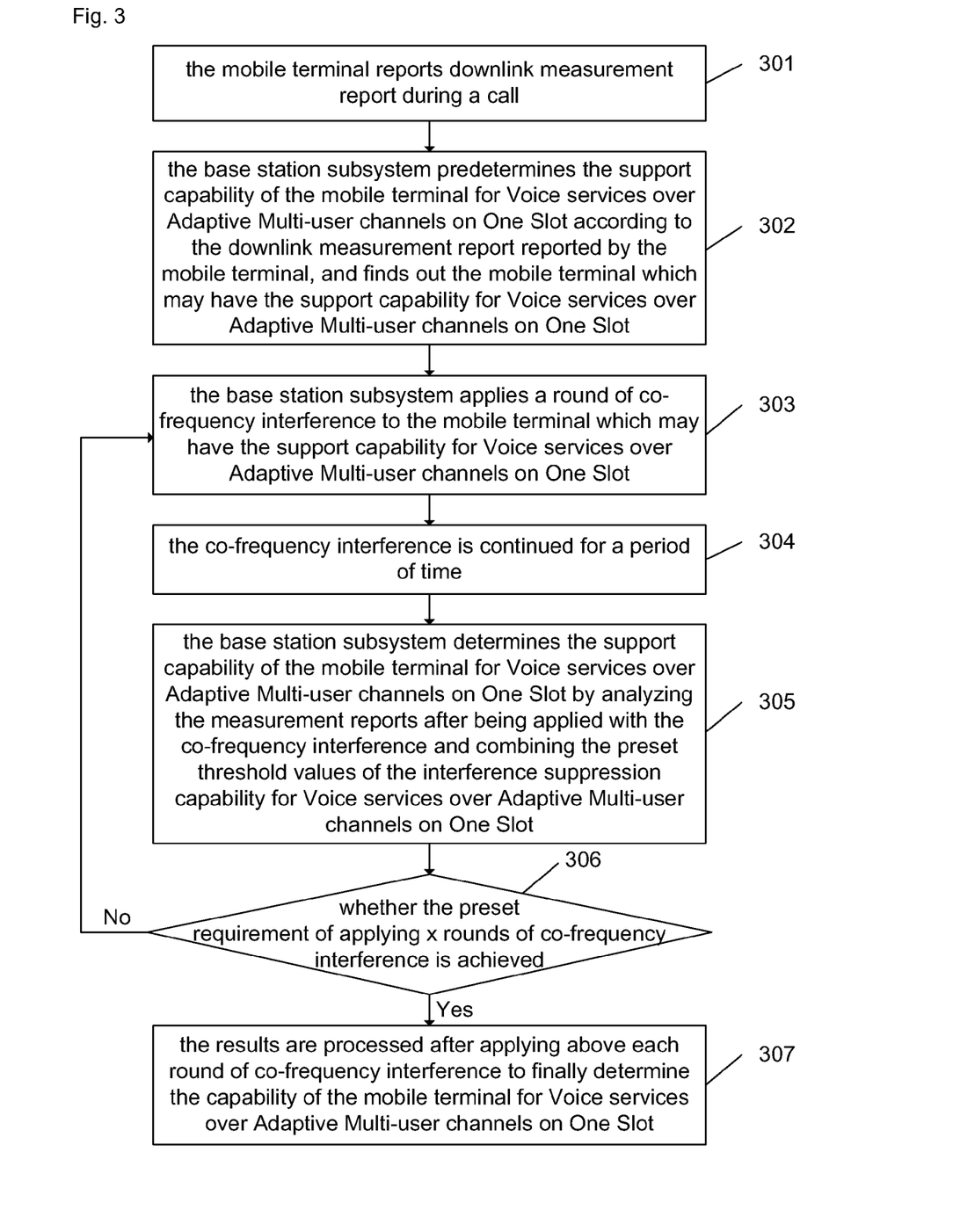
FIG. 3 is a flowchart of the example of the method of the present disclosure.

As shown in FIG. 3, when desiring to know the capability for Voice services over Adaptive Multi-user channels on One Slot supported by the mobile terminal, the base station subsystem initiates the following steps:

Step 301: the mobile terminal reports a downlink measurement report during a call.

Here, the downlink measurement report includes received signal qualities, received signal intensities, and the like.

Here, it is assumed that a certain mobile terminal has reported four downlink measurement reports continuously, including received signal qualities (Q0, Q1, Q2, Q3) and received levels (P0, P1, P2, P3).

Step 302: the base station subsystem predetermines the support capability of the mobile terminal for Voice services over Adaptive Multi-user channels on One Slot according to the downlink measurement report reported by the mobile terminal, and finds out the mobile terminal which may have the support capability for Voice services over Adaptive Multi-user channels on One Slot.

Here, for the specific implementation in the first stage of predetermination, there is a plurality of solutions according to the specific application environment and implementation features of the base station subsystem, which will be set forth respectively as follows.

Figure 4:
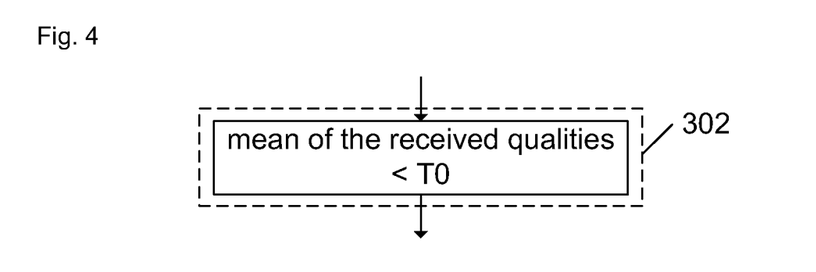
FIG. 4 is a diagram of first implementation solution for predetermination of the present disclosure.

The first solution: a mean of parameter values of the received signal qualities in N latest continuous or discrete measurement reports is calculated, if the mean is smaller than the particular threshold T0 (for example, 2), the interference suppression capability of this mobile terminal is considered to be strong, and the mobile terminal may be a mobile terminal having the support capability for Voice services over Adaptive Multi-user channels on One Slot. The diagram of the first solution is as shown in FIG. 4, which is a diagram for predetermining the capability of the mobile terminal in the first stage, and at this time the mean of the received qualities<T0, i.e., Mean([Q0, Q1, Q2, Q3])<<2.

Figure 5:
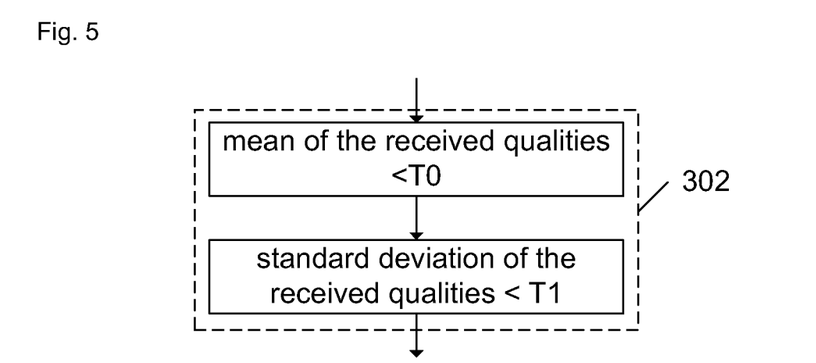
FIG. 5 is a diagram of second implementation solution for predetermination of the present disclosure.

The second solution: a standard deviation of parameter values of the received signal qualities with the mean thereof being smaller than the particular threshold T0 (for example, 2) in N latest continuous or discrete measurement reports is calculated, if the standard deviation is smaller than a particular threshold T1 (for example, 0.05), the interference suppression capability of this mobile terminal is considered to be strong, and the mobile terminal may be a mobile terminal having the support capability for Voice services over Adaptive Multi-user channels on One Slot. The diagram of the second solution is as shown in FIG. 5, which is a diagram for predetermining the capability of the mobile terminal in the first stage, wherein the mean of the received qualities<T0, i.e., Mean([Q0, Q1, Q2, Q3])<2, and the standard deviation of the received qualities<T1, i.e., Std([Q0, Q1, Q2, Q3])<0.05.

Figure 6:
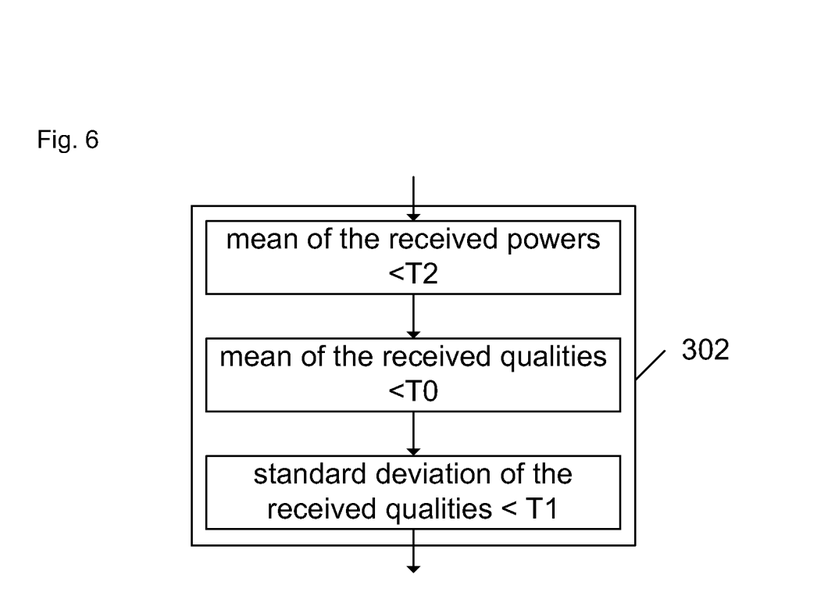
FIG. 6 is a diagram of third implementation solution for predetermination of the present disclosure.

The third solution: a predetermination is made in combination with the received signal qualities and the received signal intensities in the downlink measurement reports, for example, only the mean and the standard deviation of parameter values of the received signal qualities with the received signal intensities being smaller than a certain threshold T2 in the measurement reports are calculated, and then the subsequent process is performed. In addition, the base station subsystem sets the value of x in x rounds of co-frequency interference, wherein x can be 1 or 2, or can be defined based on the specific application environment and implementation features of the base station subsystem. The diagram of the third solution is shown as FIG. 6, which is a diagram of predetermining the capability of the mobile terminal in the first stage, wherein the mean of the received powers<T2, i.e., Mean([P0. P1, P2, P3])<T2, the mean of the received qualities<T0, i.e., Mean([Q0, Q1, Q2, Q3])<2, and the standard deviation of the received qualities<T1, i.e., Std([Q0, Q1, Q2, Q3])<0.05.

It should be pointed out that in actual specific application, one solution may be used for accomplishing the predetermination, or two or more solutions may be combined for accomplishing the predetermination, for example, the second solution and the third solution may be combined for accomplishing the predetermination. The order of the combined solutions is not limited herein.

Figure 7:
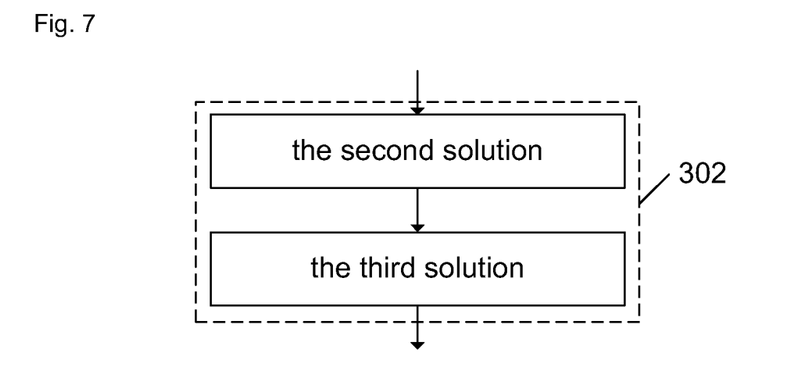
FIG. 7 is a diagram of combination implementation solution for predetermination of the present disclosure.
Figure 8:
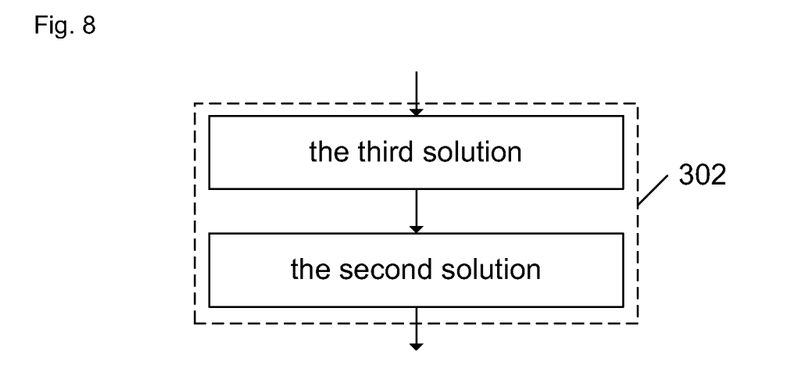
FIG. 8 is another diagram of combination implementation solution for predetermination of the present disclosure.

FIG. 7 illustrates a diagram of an example of a combination solution for predetermining the capability of the mobile terminal in the first stage, wherein the second solution above is used and then the third solution above is used. FIG. 8 illustrates a diagram of another example of the combination solution for predetermining the capability of the mobile terminal in the first stage, wherein the third solution above is used and then the second solution above is used.

Step 303: the base station subsystem applies a round of co-frequency interference to the mobile terminal which may have the support capability for Voice services over Adaptive Multi-user channels on One Slot.

Here, the power of this co-frequency interference can have various selections, for example, one selection is the same power intensity as the signal, and another selection is 2-3 dB higher than the signal power.

Step 304: the co-frequency interference is continued for a period of time.

Here, the ways of continuing the co-frequency interference can also have various selections, for example, it can be the time of a burst pulse, or the time of a plurality of continuous burst pulses, the time of a plurality of discrete (namely, discontinuous) burst pulses.

Here, in the example of the method, the mobile terminal reports one or more downlink measurement reports in this period through a plurality of continuous burst pulses. For example, this co-frequency interference continuously interferes 4 measurement reports, and the applied time for each measurement report is 26 continuous burst pulses. The mobile terminal further reports 4 downlink measurement reports in this period, including received signal qualities (Q4, Q5, Q6, Q7) and received levels (P4, P5, P6, P7).

Step 305: the base station subsystem determines the support capability of the mobile terminal for Voice services over Adaptive Multi-user channels on One Slot by analyzing the measurement reports after being applied with the co-frequency interference and combining the preset threshold values of the interference suppression capability for Voice services over Adaptive Multi-user channels on One Slot.

Here, the associated parameters in the measurement reports such as received signal qualities, received signal intensities are determined according to the specific application environment and implementation features of the base station side subsystem in combination with the preset threshold values of the interference suppression capability for Voice services over Adaptive Multi-user channels on One Slot. There may be a plurality of threshold values of the interference suppression capability for Voice services over Adaptive Multi-user channels on One Slot.

Here, for the specific implementation in the second stage of determination, there is a plurality of solutions according to the specific application environment and implementation features of the base station subsystem, which will be set forth respectively as follows.

Figure 9:
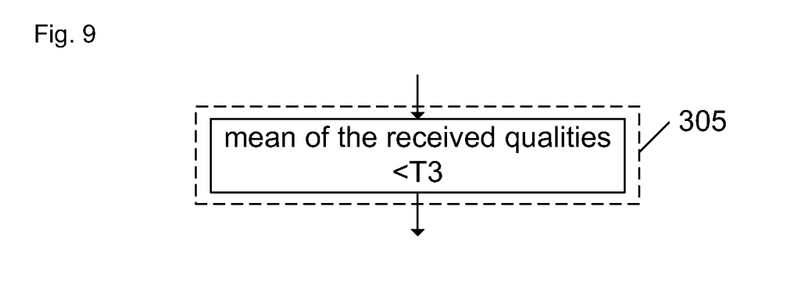
FIG. 9 is a diagram of first implementation solution for determination of the present disclosure.

The first solution: a mean of parameter values of the received signal qualities in N latest continuous or discrete measurement reports is calculated, if the mean is smaller than the particular threshold T3 (for example, 2), the interference suppression capability of this mobile terminal is considered to be strong, and the mobile terminal may be a mobile terminal having the support capability for Voice services over Adaptive Multi-user channels on One Slot. The diagram of the first solution is as shown in FIG. 9, which is a diagram for determining the capability of the mobile terminal in the second stage, and at this time the mean of the received qualities<T3, i.e., Mean([Q4, Q5, Q6, Q7])<2.

Figure 10:
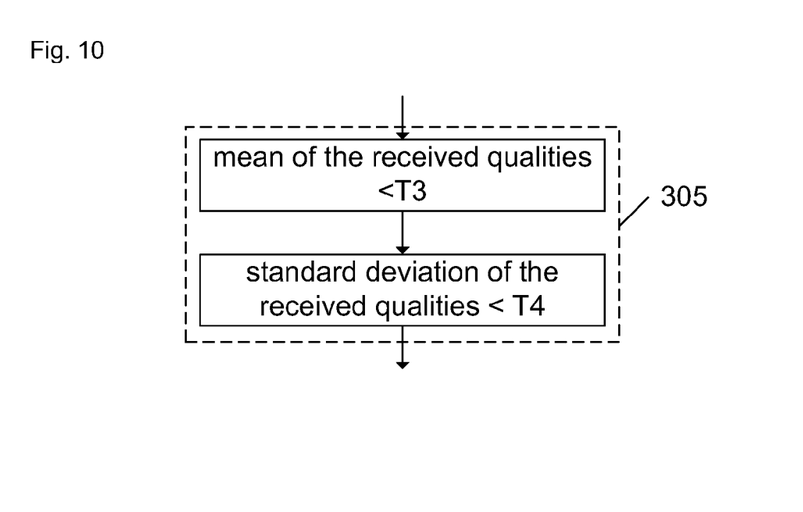
FIG. 10 is a diagram of second implementation solution for determination of the present disclosure.

The second solution: a standard deviation of parameter values of the received signal qualities with the mean thereof being smaller than the particular threshold T3 (for example, 2) in N latest continuous or discrete measurement reports is calculated, if the standard deviation is smaller than a particular threshold T4 (for example, 0.05), the interference suppression capability of this mobile terminal is considered to be strong, and the mobile terminal may be a mobile terminal having the support capability for Voice services over Adaptive Multi-user channels on One Slot. The diagram of the second solution is as shown in FIG. 10, which is a diagram for determining the capability of the mobile terminal in the second stage, wherein the mean of the received qualities<T3, i.e., Mean([Q4, Q5, Q6, Q7])<2, and the standard deviation of the received qualities<T4, i.e., Std([Q4, Q5, Q6, Q7])<0.05.

Figure 11:
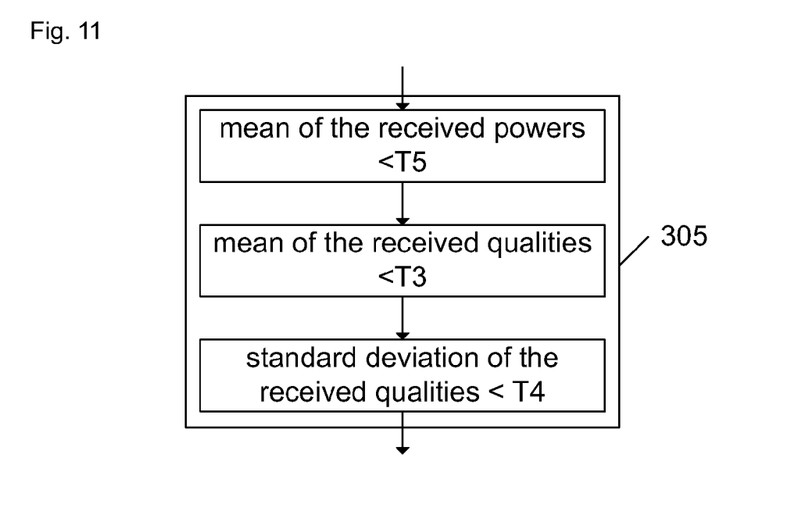
FIG. 11 is a diagram of third implementation solution for determination of the present disclosure.

The third solution: the determination is made in combination with the received signal qualities and the received signal intensities in the downlink measurement reports, for example, only the mean and the standard deviation of parameter values of the received signal qualities with the received signal intensities being smaller than a certain threshold T5 in the measurement reports are calculated, and then the subsequent process is performed. The diagram of the third solution is as shown in FIG. 11, which is a diagram of determining the capability of the mobile terminal in the second stage, wherein the mean of the received powers<T5, i.e., Mean([P4, P5, P6, P7])<T5, the mean of the received qualities<T3, i.e., Mean ([Q4, Q5, Q6, Q7])<2, and the standard deviation of the received qualities<T4, i.e., Std([Q4, Q5, Q6, Q7])<0.05.

It should be pointed out that in an actual specific application, one solution may be used for accomplishing the determination, or two or more solutions may be combined for accomplishing the determination, for example, the second solution and the third solution may be combined for accomplishing the determination. The order of the combined solutions is not limited herein.

Figure 12:
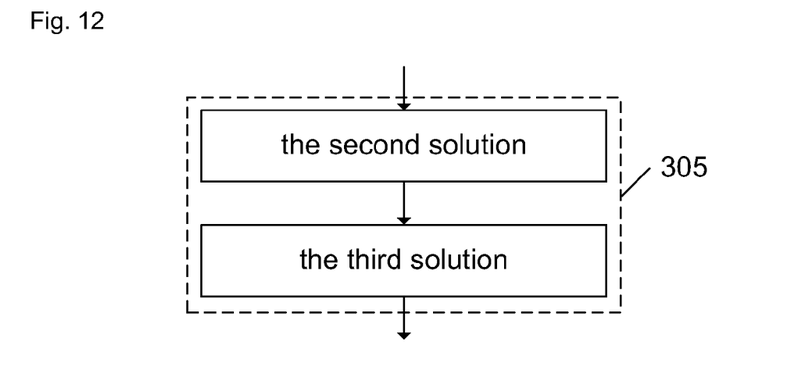
FIG. 12 is a diagram of combination implementation solution for determination of the present disclosure.
Figure 13:
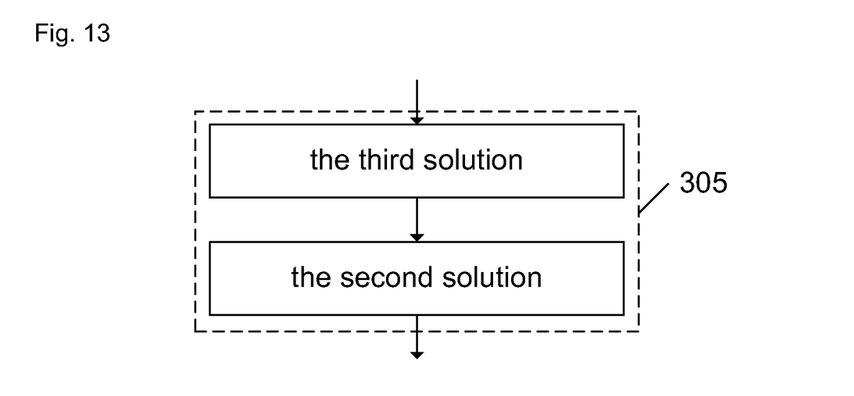
FIG. 13 is another diagram of combination implementation solution for determination of the present disclosure.

FIG. 12 illustrates a diagram of an example of a combination solution for determining the capability of the mobile terminal in the second stage, wherein the second solution above is used and then the third solution above is used. FIG. 13 illustrates a diagram of another example of the combination solution for determining the capability of the mobile terminal in the second stage, wherein the third solution above is used and then the second solution above is used.

It should be pointed out that the relationship between the thresholds T0, T1 and T2 in above Step 302 and the thresholds T3, T4 and T5 in Step 305 is that: T0 may be equal to T3, and may not be equal to T3 either; T1 may be equal to T4, and may not be equal to T4; and T2 may be equal to T5, and may not be equal to T5. The specific values will not be limited herein.

Step 306: the base station subsystem checks whether the preset requirement of applying x rounds of co-frequency interference is achieved, and if not, repeat Step 303 to Step 305; if yes, perform Step 307.

Step 307: the results are processed after applying above each round of co-frequency interference to finally determine the capability of the mobile terminal for Voice services over Adaptive Multi-user channels on One Slot.

For the processing in Step 307, there is a plurality of solutions according to the specific application environment and implementation features of the base station subsystem. For example, one solution is to use maximum possibility principle, that is, in the results after each round of co-frequency interference is applied, as long as one determination result can determine the mobile terminal has the capability for Voice services over Adaptive Multi-user channels on One Slot, it is determined that the mobile terminal is a mobile terminal with the capability. Alternatively, another solution is to use strongest limitation principle, that is, in the results after each round of co-frequency interference is applied, as long as each determination result can determine the mobile terminal has the support capability for Voice services over Adaptive Multi-user channels on One Slot, it is determined that the mobile terminal is a mobile terminal with the capability.

It should be illustrated that various changes can be made to the functions and arrangements of elements and modules within the spirit and scope set forth by the appended claims.

For example, as an implementation, in addition to being used to determine whether the mobile terminal has the capability for Voice services over Adaptive Multi-user channels on One Slot, the solution presented by the present disclosure can also used to determine whether the mobile terminal has the capability of single-antenna interference suppression elimination.

In addition, taking into account that the technology of Voice services over Adaptive Multi-user channels on One Slot continues to develop and evolve, the capability for Voice services over Adaptive Multi-user channels on One Slot of different mobile terminals will be different, for example, some mobile terminals support only a primary level of Voice services over Adaptive Multi-user channels on One Slot, they can be defined as level 1, and other mobile terminals support a higher level of Voice services over Adaptive Multi-user channels on One Slot, they can be defined as level 2, and so on. The solution presented by the present disclosure can also used for the base station subsystem adaptively determining which level the mobile terminal belongs to, which can be implemented by selecting the number of rounds and using different parameter values of the thresholds T3, T4, T5 for determining the result of each round.

A system for acquiring support capability of the mobile terminal by the base station side system, comprising: a base station side interference applying unit, a base station side detecting unit and a base station side determining unit; wherein the base station side interference applying unit is configured to apply a co-frequency interference to the mobile terminal; the base station side detecting unit is configured to detect a measurement report which is fed back by the mobile terminal after the co-frequency interference is applied; and the base station side determining unit is configured to determine and acquire the support capability of the mobile terminal for Voice services over Adaptive Multi-user channels on One Slot according to the associated parameters in the detected measurement report in combination with the associated threshold values.

Here, the base station side determining unit is further configured to, before the co-frequency interference is applied, predetermine the support capability of the mobile terminal for Voice services over Adaptive Multi-user channels on One Slot according to the associated threshold values in combination with the associated parameters in a downlink measurement report which is fed back by the mobile terminal before the co-frequency interference is applied.

The different implementations of the base station side determining unit will be set forth respectively hereinafter when the predetermining process and determining process are implemented.

During the predetermining process, the base station side determining unit is further configured to perform at least one of the following predetermining implementations, wherein the predetermining implementations particularly comprise:

First: a mean of parameter values of received signal qualities in N latest continuous or discrete downlink measurement reports is calculated, and it is predetermined that the mobile terminal is a mobile terminal with the support capability for Voice services over Adaptive Multi-user channels on One Slot when the calculated mean is smaller than the threshold value T0.

Second: a standard deviation of parameter values of received signal qualities in N latest continuous or discrete downlink measurement reports is calculated, and it is predetermined that the mobile terminal is a mobile terminal with the support capability for Voice services over Adaptive Multi-user channels on One Slot when the calculated standard deviation is smaller than a threshold value T1, wherein the received signal qualities are received signal qualities in the downlink measurement reports with the mean thereof being smaller than the threshold value T0.

Third: a mean of parameter values of received signal intensities in N latest continuous or discrete downlink measurement reports is calculated, and a mean and a standard deviation of parameter values of the received signal qualities in the measurement reports with the mean of the received signal intensities being smaller than the threshold value T2 are calculated, and it is predetermined that the mobile terminal is a mobile terminal with the support capability for Voice services over Adaptive Multi-user channels on One Slot when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

During the determining process, the base station side determining unit is further configured to perform at least one of the following determining implementations, wherein the determining implementations particularly comprise:

First: a mean of parameter values of the received signal qualities in N latest continuous or discrete measurement reports is calculated, and it is determined that the mobile terminal is a mobile terminal with the support capability for Voice services over Adaptive Multi-user channels on One Slot when the calculated mean is smaller than a threshold value T3.

Second: a standard deviation of parameter values of the received signal qualities in N latest continuous or discrete measurement reports is calculated, and it is determined that the mobile terminal is a mobile terminal with the support capability for Voice services over Adaptive Multi-user channels on One Slot when the calculated standard deviation is smaller than a threshold value T4, wherein the received signal qualities are received signal qualities in the measurement reports with the mean thereof being smaller than the threshold value T3.

Third: a mean of parameter values of received signal intensities in N latest continuous or discrete measurement reports is calculated, and a mean and a standard deviation of parameter values of the received signal qualities in the measurement reports with the mean of the received signal intensities being smaller than a threshold value T5 are calculated, and it is determined that the mobile terminal is a mobile terminal with the support capability for Voice services over Adaptive Multi-user channels on One Slot when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

Here, the base station controller to which the above description relates is represented as Base Station Controller (BSC); the base station is represented as Base Station (BTS); the base station subsystem is represented as BSS Base Station Subsystem; the enhanced base station is represented as Enhanced Base Station (eBTS); and Voice services over Adaptive Multi-user channels on One Slot is represented as Voice services over adaptive multi-user channels on One slot.

The above description is only the preferred embodiments of the present disclosure and is not intended to limit the protection scope of the present disclosure.

The invention claimed is:

1. A method for acquiring support capability of a mobile terminal by a base station side system, comprising:
   applying, by the base station side system, a co-frequency interference to the mobile terminal; and
   detecting, by the base station side system, a measurement report which is fed back by the mobile terminal after the co-frequency interference is applied, and determining and acquiring, by the base station side system, the support capability of the mobile terminal for Voice services over Adaptive Multi-user channels on One Slot according to associated parameters in the detected measurement report in combination with associated threshold values.

2. The method according to claim 1, further comprising: before the co-frequency interference is applied:
   predetermining, by the base station side system, the support capability of the mobile terminal for the Voice services over Adaptive Multi-user channels on One Slot according to the associated threshold values in combination with associated parameters in a downlink measurement report which is fed back by the mobile terminal before the co-frequency interference is applied.

3. The method according to claim 1, wherein applying the co-frequency interference further comprises:
   applying one round of co-frequency interference, or applying multiple rounds of co-frequency interference, wherein when multiple rounds of co-frequency interference are applied, a number of rounds of co-frequency interference to be applied needs to be set; the number of rounds is set according to a specific application environment and an implementation feature of the base station side system.

4. The method according to claim 3, wherein the associated parameters are parameters for characterizing interference processing capability of the mobile terminal.

5. The method according to claim 3, wherein when the multiple rounds of co-frequency interferences are applied, the method further comprises:
   determining the mobile terminal is a mobile terminal with the capability, when one of determination results obtained after respective rounds of co-frequency interference are applied can determine the mobile terminal has the capability; or
   determining the mobile terminal is a mobile terminal with the capability, when each determination result obtained after respective rounds of co-frequency interference are applied can determine the mobile terminal has the capability.

6. The method according to claim 2, wherein the predetermining comprises at least one of the following:
   calculating a mean of parameter values of received signal qualities in N latest continuous or discrete downlink measurement reports, and predetermining the mobile terminal is a mobile terminal with the capability when the calculated mean is smaller than a threshold value T0;

calculating a standard deviation of parameter values of received signal qualities in N latest continuous or discrete downlink measurement reports, and predetermining the mobile terminal is a mobile terminal with the capability when the calculated standard deviation is smaller than a threshold value T1, wherein the received signal qualities are received signal qualities in the downlink measurement reports with the mean of the received signal qualities being smaller than the threshold value T0;

calculating a mean of parameter values of received signal intensities in N latest continuous or discrete downlink measurement reports, and calculating a mean and a standard deviation of parameter values of the received signal qualities in the measurement reports with the mean of the received signal intensities being smaller than a threshold value T2, and predetermining the mobile terminal is a mobile terminal with the capability when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

7. The method according to claim 1, wherein the determining comprises at least one of the following:

calculating a mean of parameter values of received signal qualities in N latest continuous or discrete measurement reports, and determining the mobile terminal is a mobile terminal with the capability when the calculated mean is smaller than a threshold value T3;

calculating a standard deviation of parameter values of the received signal qualities in N latest continuous or discrete measurement reports, and determining the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

calculating a mean of parameter values of received signal intensities in N latest continuous or discrete measurement reports, and calculating a mean and a standard deviation of parameter values of the received signal qualities in the measurement reports with the mean of received signal intensities being smaller than a threshold value T5, and determining the mobile terminal is a mobile terminal with the capability when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

8. The method according to claim 2, wherein applying the co-frequency interference further comprises:

applying one round of co-frequency interference, or applying multiple rounds of co-frequency interference, wherein when multiple rounds of co-frequency interference are applied, a number of rounds of co-frequency interference to be applied needs to be set; the number of rounds is set according to a specific application environment and an implementation feature of the base station side system.

9. The method according to claim 8, wherein the associated parameters are parameters for characterizing interference processing capability of the mobile terminal.

10. The method according to claim 8, wherein when the multiple rounds of co-frequency interferences are applied, the method further comprises:

determining the mobile terminal is a mobile terminal with the capability, when one of determination results obtained after respective rounds of co-frequency interference are applied can determine the mobile terminal has the capability; or determining the mobile terminal is a mobile terminal with the capability, when each determination result obtained after respective rounds of co-frequency interference are applied can determine the mobile terminal has the capability.

11. The method according to claim 2, wherein the determining comprises at least one of the following:

calculating a mean of parameter values of received signal qualities in N latest continuous or discrete measurement reports, and determining the mobile terminal is a mobile terminal with the capability when the calculated mean is smaller than a threshold value T3;

calculating a standard deviation of parameter values of the received signal qualities in N latest continuous or discrete measurement reports, and determining the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

calculating a mean of parameter values of received signal intensities in N latest continuous or discrete measurement reports, and calculating a mean and a standard deviation of parameter values of the received signal qualities in the measurement reports with the mean of received signal intensities being smaller than a threshold value T5, and determining the mobile terminal is a mobile terminal with the capability when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

12. A system for acquiring support capability of a mobile terminal by a base station side system, comprising: a base station side interference applying unit, a base station side detecting unit and a base station side determining unit; wherein the base station side interference applying unit is configured to apply a co-frequency interference to the mobile terminal;

the base station side detecting unit is configured to detect a measurement report which is fed back by the mobile terminal after the co-frequency interference is applied; and the base station side determining unit is configured to determine and acquire the support capability of the mobile terminal for Voice services over Adaptive Multi-user channels on One Slot according to associated parameters in the detected measurement report in combination with associated threshold values.

13. The system according to claim 12, wherein the base station side determining unit is further configured to, before the co-frequency interference is applied, predetermine the support capability of the mobile terminal for the Voice services over Adaptive Multi-user channels on One Slot according to the associated threshold values in combination with associated parameters in a downlink measurement report which is fed back by the mobile terminal before the co-frequency interference is applied.

14. The system according to claim 13, wherein the base station side determining unit is further configured to implement at least one of the following predetermining implementations, wherein the predetermining implementations comprise:

calculating a mean of parameter values of received signal qualities in N latest continuous or discrete downlink measurement reports, and predetermining the mobile terminal is a mobile terminal with the capability when the calculated mean is smaller than a threshold value T0;

calculating a standard deviation of parameter values of received signal qualities in N latest continuous or discrete downlink measurement reports, and predetermining the mobile terminal is a mobile terminal with the capability when the calculated standard deviation is smaller than a threshold value T1, wherein the received signal qualities are received signal qualities in the downlink measurement reports with the mean of the received signal qualities being smaller than the threshold value T0;

calculating a mean of parameter values of received signal intensities in N latest continuous or discrete downlink measurement reports, and calculating a mean and a standard deviation of parameter values of the received signal qualities in the measurement reports with the mean of the received signal intensities being smaller than a threshold value T2, and predetermining the mobile terminal is a mobile terminal with the capability when the calculated standard deviation is smaller than the threshold value T1, wherein the received signal qualities utilized when calculating the standard deviation of the received signal qualities are received signal qualities in the downlink measurement reports with the mean of the received signal qualities being smaller than the threshold value T0.

15. The system according to claim 12, wherein the base station side determining unit is further configured to implement at least one of the following determining implementations, wherein the determining implementations comprise:

calculating a mean of parameter values of received signal qualities in N latest continuous or discrete measurement reports, and determining the mobile terminal is a mobile terminal with the capability when the calculated mean is smaller than a threshold value T3;

calculating a standard deviation of parameter values of the received signal qualities in N latest continuous or discrete measurement reports, and determining the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

calculating a mean of parameter values of received signal intensities in N latest continuous or discrete measurement reports, and calculating a mean and a standard deviation of parameter values of the received signal qualities in the measurement reports with the mean of the received signal intensities being smaller than a threshold value T5, and determining the mobile terminal is a mobile terminal with the capability when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

16. The system according to claim 13, wherein the base station side determining unit is further configured to implement at least one of the following determining implementations, wherein the determining implementations comprise:

calculating a mean of parameter values of received signal qualities in N latest continuous or discrete measurement reports, and determining the mobile terminal is a mobile terminal with the capability when the calculated mean is smaller than a threshold value T3;

calculating a standard deviation of parameter values of the received signal qualities in N latest continuous or discrete measurement reports, and determining the mobile terminal is a mobile terminal with the capability when the calculated standard deviation is smaller than a threshold value T4, wherein the received signal qualities are received signal qualities in the measurement reports with the mean of the received signal qualities being smaller than the threshold value T3;

calculating a mean of parameter values of received signal intensities in N latest continuous or discrete measurement reports, and calculating a mean and a standard deviation of parameter values of the received signal qualities in the measurement reports with the mean of the received signal intensities being smaller than a threshold value T5, and determining the mobile terminal is a mobile terminal with the capability when the calculated standard deviation is smaller than the threshold value T4, wherein the received signal qualities utilized when calculating the standard deviation of the received signal qualities are received signal qualities in the measurement reports with the mean of the received signal qualities being smaller than the threshold value T3.

\* \* \* \* \*